2,967,370

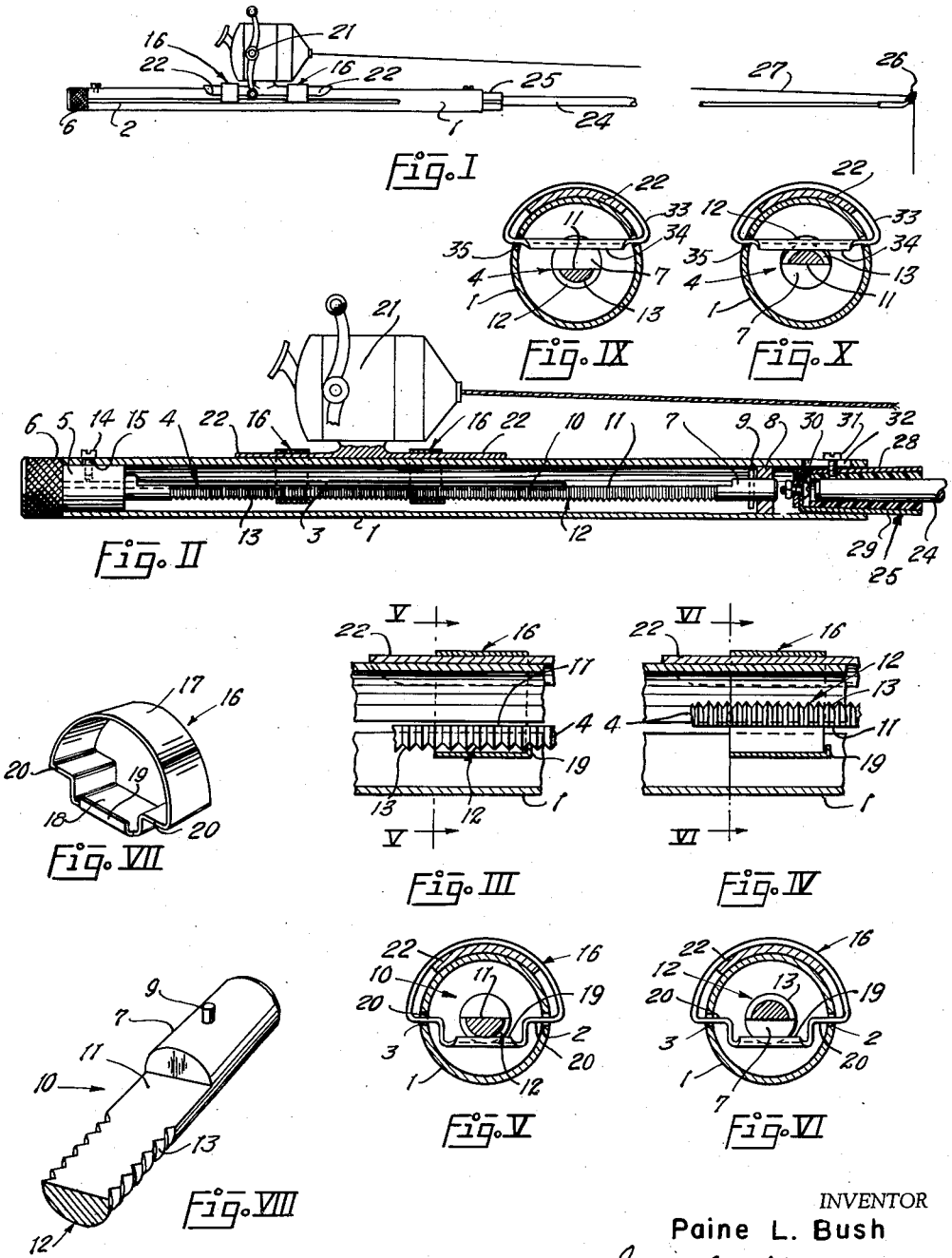
Jan. 10, 1961  P. L. BUSH  2,967,370
FISHING REEL SECURING MEANS
Filed Feb. 26, 1959
INVENTOR
Paine L. Bush
ATTORNEYS

FISHING REEL SECURING MEANS

Paine L. Bush, 822 Stewart Drive, Dallas, Tex.

Filed Feb. 26, 1959, Ser. No. 795,656

13 Claims. (Cl. 43—22)

This invention has to do with a fishing reel clamp and is particularly concerned with a fishing reel clamp for detachably affixing a fishing reel to a fishing rod.

Fishing reels, and particularly spinning reels, are customarily provided with a foot having oppositely disposed horizontal legs thereon, which are usually conformed to the cylindrical shape of the fishing reel handle and may be disposed thereagainst and held in place thereto by lock rings which are slidable on the handle and are forced about the legs to secure same in place.

Such locking rings do not provide a satisfactory securing means in that they often become distorted in shape so that they are difficult to force over the legs of the reel and if they become bent or distorted while secured to such legs, they are difficult to remove.

Furthermore such locking rings often become worn and stretched in use to such an extent as to not provide a secure and positive engagement and often allow the reel to become loose, requiring repeated adjustment and interfering with the smooth functioning of the reel and preventing accurate casting.

It is, therefore, a primary object of this invention to provide a reel attachment mechanism which provides a secure and rigid attachment of the reel to a fishing rod.

Another object of the invention is to provide a reel attachment mechanism which is easy to manipulate for attachment and detachment of the fishing reel to the fishing rod.

A still further object of the invention is to provide a reel attachment mechanism which provides a rigid attachment of the reel to the fishing rod and in such a manner that the reel will not become loose on the rod.

An additional object of the invention is to provide a fishing rod securing means in which the locking rings are free and easily slidable to and from engagement with the legs of the fishing reel when the device is in unlocked position.

A specific object of the invention is to provide a reel attachment device in which the locking rings are locked to the legs of the fishing reel by means of an eccentric shaft which is rotated thereagainst.

A further object of the invention is to provide such a reel attachment means wherein the eccentric shaft presses the locking rings into engagement with the legs on the reel and in which the rod is provided with serrations on the surface thereof which engage with ribs on the locking clamps to prevent longitudinal movement of the locking rings.

Suitable embodiments of the invention are shown in the attached drawing wherein:

Figure I is a side elevational view of a fishing rod having a spinning reel attached thereto by means of an attachment mechanism disclosed and claimed herein;

Figure II is a partially sectionalized, side elevational view of a fishing reel attachment mechanism, incorporating the invention claimed herein, showing a spinning reel attached to a fishing rod by means of such attachment mechanism;

Figure III is an enlarged fragmentary, cross-sectional, elevational view showing one of the locking rings of the form shown in Figure II engaged by the eccentric shaft;

Figure IV is a fragmentary, cross-sectional, elevational view showing the locking ring and eccentric shaft of Figure III in disengaged position;

Figure V is a transverse, cross-sectional view taken on the line V—V of Figure III;

Figure VI is a transverse, cross-sectional view taken on the line VI—VI of Figure IV;

Figure VII is a perspective view of one of the locking rings;

Figure VIII is an enlarged fragmentary view of the locking shaft showing the inner end thereof and the serrations spaced along one side thereof;

Figure IX is a transverse, cross-sectional view showing a modified form of locking ring with the eccentric shaft out of engagement form of locking ring with the eccentric shaft out of engagement with the rib thereon; and Figure X is a transverse, cross-sectional view of the modified form of ring shown in Figure IX, showing the eccentric shaft engaged with the rib thereon.

Numeral references are employed to denote the various parts in the drawings, and like numerals indicate like parts throughout the various figures of the drawings.

The preferred forms of the reel attachment mechanism shown in the drawings are merely illustrative of suitable forms for carrying out the invention, it being understood that other and further forms can be made without departing from the spirit and scope of the appended claims.

Referring to the drawings, the numeral I indicates a tubular handle or housing which has diametrically opposed, longitudinal slots 2 and 3 extending through the wall thereof.

A locking shaft, generally indicated at 4, has an enlarged outer head portion 5 thereon to which is secured a knurled rotating member 6, said head 5 being rotatable in the housing 1. The inner end of the locking shaft 4 has a cylindrical inner head 7 thereon which is rotatable in a bushing 8 attached in the tubular housing 1. A stop pin 9 extends through the head 7 and is engageable with the bushing 8 to limit the inward movement of the head 7 with relation to the bushing when assembling the locking shaft with relation to the housing.

The locking shaft 4 includes an intermediate portion 10, which has a flat side 11, co-extensive with the longitudinal axis of the housing 1 and head 5, and a generally semi-cylindrical side 12, which has formed thereon a plurality of notches or serrations 13, for the purpose hereinafter described. When assembled as shown in Figure II the shaft portion 10 extends through the clamp members 16.

The head 5 may be rotated to thereby rotate the intermediate part 10 and such head may be secured in a desired position by means of a set screw 14 which is threaded into the head 5 and extends through a peripheral slot 15 in the wall of the housing 1. The set screw 14 is permitted to move in the slot 15 when the set screw 14 is loosened but secures the head 5 to the housing 1 when the set screw is tightened.

A pair of locking rings or clamps 16 are slidably disposed on the tubular housing 1. Each of the locking rings 16 includes a substantially semi-circular side 17 and a straight side 18, which is connected to the semi-circular side 17 by offset angle portions 20.

An upstanding inwardly-extending rib 19 is formed at one edge of the straight side 18. The clamps 16 are disposed on the tubular housing 1 by inserting the angular portions 20 in the oppositely disposed slots 2 and 3, with the semi-circular side 17 on the outside of the housing 1 so that the clamps may be moved longitudinally along the housing. The clamp 16 may be slid along the housing 1 to any desired position to engage the legs 22 of a fishing reel.

A suitable form of fishing reel 21 is illustrated, it being understood that any form of fishing reel having horizontal legs 22 thereon may be mounted by means of the attachment mechanism herein described.

In order to mount a fishing reel, such as shown at 21, to the housing 1, the clamps 16 are moved along the housing 1 in opposite directions to provide suitable separation so that the legs 22 can be placed against the housing 1 between the clamps. Prior to making such adjustment the shaft 4 is rotated so that the flat side 11 lies along the inner face of the straight side 18 of the clamp 16, as shown in Figures IV and VI. In such position the clamp 16 may be freely moved longitudinally with respect to the housing 1. After the legs 22 of the fishing reel have been placed adjacent the housing 1, between the clamps 16, the clamps are moved toward each other along the housing 1 and slipped over the legs 22. The shaft 4 is then rotated, thereby causing the notches 13 in the semi-cylindrical side 13 of the intermediate portion 10 to engage the inwardly extending ribs 19 on the clamps 16, thus engaging and locking in place the clamp 16. Since the semi-cylindrical side 13 of the shaft portion 10 is off-center or eccentric with relation to the axis of the shaft head 5, tension is exerted between the intermediate portion 10 and the clamps 16 to thereby firmly press and engage the legs 22 to the housing 1.

Particular attention is called to the construction of the locking shaft 4 wherein the intermediate part 10 provides an eccentric engaging surface 13 with relation to the axis of the heads 5 and 7 and the housing 1. In the form illustrated the eccentricity of the engaging portion of the shaft is conveniently formed by simply cutting it in half longitudinally, providing a substantially semi-cylindrical shaft having notches on the cylindrical side. Thereby an engaging surface is provided which in one rotative position will engage the ribs 19, but in another position is free of engagement with said ribs.

It will be apparent that other forms of eccentric shafts for accomplishing the same purpose and function can be provided. For instance, the shaft could be entirely round, with notches on one or all sides, but offset with relation to the axis of the head 5 and housing 1 sufficiently so that in one position of rotation it would engage the clamp 16 but in another position would be free of engagement.

It will be apparent that the clamps 16 may be disengaged from the legs 22 of the reel 21 simply by loosening the set screw 14 and rotating the head 5 and the shaft portion 10 to the position shown in Figure VI.

A conventional fishing rod 24 may be attached to the housing 1 by means of a chuck, generally indicated at 25. The fishing rod 24 includes an eye 26 at the outer end thereof through which the fishing line 27 may be guided.

The chuck 25 may take several different forms but as shown includes semi-circular halves 28 and 29 which are loosely bolted together by a bolt 30 so that they can be separated sufficiently to allow the end of the fishing rod 24 to be inserted therebetween. After the fishing rod has been so engaged by the halves of the chuck, the chuck is forced into the open end of the housing 1, thus pressing the halves 28 and 29 together, clamping the end of the fishing rod. After the chuck has been so placed in the end of the housing, a set screw 31 is inserted through a longitudinal slot 32 in the wall of the housing 1 and threadedly engaged with the chuck 25, to thereby retain the chuck in place in the end of the housing 1.

A modified form of clamping ring, indicated generally by the numeral 33, is shown in Figures IX and X. In this form the rib 34 is turned outwardly of the straight side 35, as distinguished from the rib 19, which is turned inwardly. The shaft 4 is disposed below the ring 33. It will be seen that when the cylindrical side 12 of the shaft 4 is rotated into contact with the rib 34 the notches 13 thereon engage the rib 34 and clamp the ring in place and hold it against longitudinal movement. It will be noted that the flat side 35 of the ring 33 is located off-center with relation to the housing 1 so that when the centrally disposed eccentric shaft 4 is rotated the cylindrical side will engage the ribs 34.

It will thus be seen that I have provided improvements in means for attaching a fishing reel to a fishing rod which provides a secure and rigid attachment of the fishing reel to the rod, which is simple in construction, and easy to manipulate.

I claim:

1. In a device of the class described, a tubular housing having diametrically opposed longitudinal slots through the wall thereof; a shaft rotatably mounted in the housing and having a portion eccentric to the longitudinal axis of the housing; a pair of hollow clamps, each having a substantially semi-circular side and a straight side, the straight side being slidable along said slots and extending adjacent said shaft, and the semi-circular side extending about the wall of the housing; a rib on the flat side of each clamp; and a series of notches on the eccentric portion of the shaft engageable with the ribs in one position of rotation of the shaft.

2. The combination called for in claim 1 wherein the straight sides of the clamps extend about the eccentric portion of the shaft and the ribs thereon are turned inwardly thereof.

3. The combination called for in claim 1 wherein the eccentric portion of the shaft is outside the straight sides of the clamps and the ribs thereon are turned outwardly thereof.

4. The combination called for in claim 1 wherein the eccentric portion of the shaft includes a flat side and a substantially semi-cylindrical side, the cylindrical side having the series of notches thereon engageable with the ribs.

5. The combination called for in claim 1 with the addition of means to secure the shaft to the housing in a predetermined position of rotation.

6. In a device of the class described; a tubular housing having diametrically opposed longitudinal slots extending through the wall of the housing; a pair of hollow clamp members, each of which has a semi-circular side adapted to slide over the housing and a straight side movable along said slots; a rotatable shaft mounted in and extending longitudinally of the housing and having a part extending through the clamps, said part being substantially semi-cylindrical in shape and having a flat side and a cylindrical side with a series of notches thereon; and an inwardly extending rib on the straight side of each of the clamps engageable with the notches upon rotation of the cylindrical side of the shaft thereagainst.

7. The combination called for in claim 6 wherein the flat side of the shaft is substantially co-planar with the longitudinal axis of the housing.

8. In a device of the class described, a tubular housing having diametrically opposed longitudinal slots through the walls thereof; a shaft rotatable in the housing and having a portion eccentric to the longitudinal axis of the housing; a pair of hollow clamps, each having a substantially circular side and a straight side, the straight side being slidable along said slots and extending about said shaft and the circular side extending about the wall of the housing; a rib on the straight side of each clamp; a series of notches on the eccentric portion of the shaft engageable with the ribs in one position of rotation of the shaft; and means in the end of the housing engageable with a fishing rod to support same.

9. The combination called for in claim 8 wherein the means for engaging the fishing rod is a chuck insertable in the open end of the housing.

10. In a device of the class described, a hollow handle having a pair of diametrically opposed longitudinal slots through the wall of the handle, dividing the handle into two wall segments; a pair of hollow clamps slidable over one segment and each clamp having a transverse part extending between the opposite walls of said segment; a shaft rotatable in said handle and having a portion eccentric to the axis of the handle and extending adjacent said transverse parts; said eccentric portion of the shaft having means thereon engageable with the clamps in one position of rotation to lock the clamps in place against longitudinal movement.

11. The combination called for in claim 10 wherein the locking means comprises a series of notches on the eccentric portion of the shaft engageable with ribs on the clamps.

12. The combination called for in claim 10 wherein the locking means comprises a series of notches on the eccentric portion of the shaft engageable with inwardly turned ribs on the clamps.

13. The combination called for in claim 10 wherein the locking means comprises a series of notches on the eccentric portion of the shaft engageable with outwardly turned ribs on the clamps.

References Cited in the file of this patent

UNITED STATES PATENTS 441,126   Boone _____ Nov. 25, 1890